United States Patent
Bhatnagar et al.

(10) Patent No.: US 11,003,431 B2
(45) Date of Patent: May 11, 2021

(54) GENERATING PREDICTIVE METRICS FOR VIRTUALIZED DEPLOYMENTS

(71) Applicant: VMWARE, INC., Palo Alto, CA (US)

(72) Inventors: Yash Bhatnagar, Bangalore (IN); Dattathreya Sathyamurthy, Bangalore (IN); Swarnalatha Pasupuleti, Bangalore (IN); Naveen Mudnal, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/726,282

(22) Filed: Dec. 24, 2019

(65) Prior Publication Data

US 2020/0334022 A1 Oct. 22, 2020

(30) Foreign Application Priority Data

Mar. 18, 2019 (IN) .............................. 201941010485

(51) Int. Cl.
*G06F 9/44* (2018.01)
*G06F 8/60* (2018.01)
*G06F 9/455* (2018.01)
*G06N 5/04* (2006.01)

(52) U.S. Cl.
CPC ............ *G06F 8/60* (2013.01); *G06F 9/45533* (2013.01); *G06N 5/04* (2013.01); *G06F 9/45541* (2013.01)

(58) Field of Classification Search
CPC ....................................................... G06F 9/44
See application file for complete search history.

(56) References Cited

U.S. PATENT DOCUMENTS

| | | | | |
|---|---|---|---|---|
| 8,738,333 B1* | 5/2014 | Behera | .................. | G06F 9/5061 703/2 |
| 8,850,442 B2* | 9/2014 | Davis | .................... | G06F 9/5077 718/104 |
| 2009/0049317 A1* | 2/2009 | Gara | ....................... | G06F 1/263 713/320 |
| 2017/0185438 A1* | 6/2017 | Thomas | .............. | G06F 9/45558 |

\* cited by examiner

*Primary Examiner* — Jae U Jeon
(74) *Attorney, Agent, or Firm* — Thomas | Horstemeyer LLP

(57) ABSTRACT

Various examples are disclosed for generating a prediction of server requirements needed to deploy an application. The application can be deployed in virtualized environment in which virtual machines can execute the application. The predicted server requirements can be generated based upon data from other deployments of the application in other virtualized environments.

20 Claims, 5 Drawing Sheets

GENERATING PREDICTIVE METRICS FOR VIRTUALIZED DEPLOYMENTS

RELATED APPLICATIONS

Benefit is claimed under 35 U.S.C. 119(a)-(d) to Foreign Application Serial No. 201941010485 filed in India entitled "GENERATING PREDICTIVE METRICS FOR VIRTUALIZED DEPLOYMENT", on Mar. 18, 2019, by VMWARE, Inc., which is herein incorporated in its entirety by reference for all purposes.

BACKGROUND

Data centers include various physical and virtual components that, when executed, provide web services, cloud computing environments, virtualization environments, as well as other distributed computing systems. For instance, data centers can include hardware and software to provide computer virtualization services, which relate to the creation of a virtualized version of a physical device, such as a server, a storage device, a central processing unit (CPU), a graphics processing unit (GPU), or other computing resources. Data centers can also include virtual machines (VMs), which include emulations of a computer system that can be customized to include a predefined amount of random access memory (RAM), hard drive storage space, as well as other computing resources that emulate a physical machine.

Different enterprises often deploy similar applications in a virtualized computing environment. For example, two different enterprises in the healthcare industry can have the need to deploy a customer relationship management (CRM) application. While the scale of their deployments might vary, they might use the same CRM application deployed across a fleet of servers that are running VMs that power the CRM application. As another example, two different enterprises in different industries might deploy the same application at the same scale (e.g., number of supported users). A consultant, vendor, or administrator serving enterprises deploying applications across a fleet of servers may desire predictive metrics about a deployment before undertaking a project. A consultant might wish to generate a proposal that includes information about how many and what assortment of servers that will be required to deploy an application for an enterprise. The proposal can include a prediction of how many servers are needed for a particular deployment. An accurate prediction can facilitate the creation of an accurate estimate of the cost of making a deployment.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to generating predictive metrics for a virtualized deployment of an application. A virtualized deployment of an application can involve physical servers executing virtual machines (VMs) that execute a particular application on behalf of an enterprise. Execution of the application can entail running software components and services on the VMs in the deployment to provide a particular application or service for the enterprise. For example, an enterprise requiring a customer relationship management (CRM) solution might choose a particular vendor's software and task employees or consultants to implement the solution using one or more physical servers. Implementation of the application can involve acquiring or setting up physical servers, configuring VMs on the servers, and deploying the servers in a data center.

Enterprises often leverage virtualization technologies from companies like VMWARE to provision the infrastructure required to deploy, manage and monitor a particular application. The enterprise, or consultants hired by the enterprise, can calculate the infrastructure requirements that are necessary for hosting the application. The infrastructure requirements can include servers, VMs, application licenses, and management software. The enterprise then produces an estimate or projection of the cost required to deploy the application at a particular scale.

Generating an accurate estimate of the number or type of physical servers can be an important consideration. Before embarking on the selection of a consultant or vendor to perform the implementation process, an enterprise might seek proposals that outline the estimated cost to acquire the physical servers and deploy the application. A vendor might utilize experience or data from previous implementations performed by the vendor, but this data might be insufficient to accurately predict the number of servers needed for an application deployment.

For instance, a vendor might have data from a previous deployment of a CRM application that is requested by an enterprise, but the previous deployment might be for an enterprise in a different industry and at a different scale. Additionally, a sample size of previous experience by a vendor might too small to provide an accurate estimate for a requested application deployment. Therefore, examples of this disclosure provide a systematic way to generate more accurate predictions for the infrastructure required to deploy an application at a particular scale. The predictions rely upon data gathered by the virtualization platform from other virtualization deployments of other enterprises.

Figure 1:
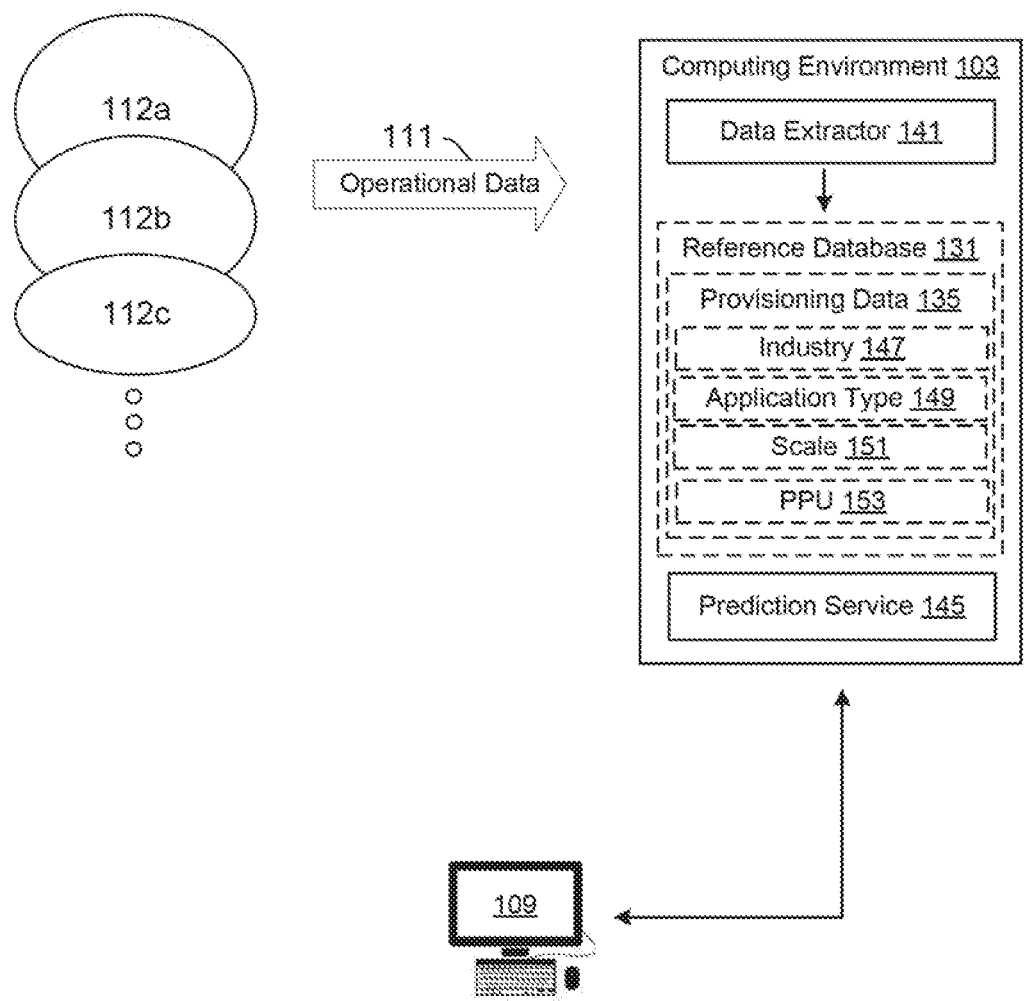
FIG. 1 is a drawing of an example of a networked computing environment having a prediction service and a data extractor according to an example of the disclosure.

Turning now to FIG. 1, an example of a networked environment 100 is shown. The networked environment 100 can include a computing environment 103, at least one client device 109, and one or more virtualized deployments 112 that can be in communication over one or more networks. The networks can include, for example, the Internet, intranets, extranets, wide area networks (WANs), local area networks (LANs), wired networks, wireless networks, other suitable networks, or any combination of two or more such networks.

The virtualized deployments 112 can include customer deployments that are implemented using a common virtualization platform, such as VMWARE VSPHERE. The virtualized deployments 112 can be implemented on behalf of one or more enterprises and implement applications at various scales. In the context of this disclosure, the term scale means a number of users that a deployment is expected to support. For example, a CRM application deployed to support approximately 10,000 users is associated with a scale of approximately 10,000 users.

The virtualized deployments 112 can include physical servers that are executing VMs powered by the virtualization platform. The virtualized deployments 112 can be configured with software that reports back to the platform provider certain information about the deployment. The information reported by a respective virtualized deployment 112 can include operational data 111 about the health and status of the VMs in the virtualized deployment 112. The operational data 111 can identify the enterprise for which a particular deployment was implemented, an indicator of the industry in which the enterprise operates, and the application for the enterprise that the VM is supporting. The operational data 111 can also include an indicator of the scale of the deployment as well. In some examples, the operational data 111 can identify details about the physical servers on which the virtualized deployment 112 is implemented. In this way, the size of the virtualized deployment 112 can be obtained or deduced from the operational data 111 that is generated by and collected from the respective deployments.

In various examples, the computing environment 103 can include an enterprise computing environment that is associated with a virtualization platform on which the virtualized deployments 112 are implemented. For example, the computing environment 103 can represent one or more servers with which the VMs, management services, and other aspects of the virtualized deployments 112 can communicate. The computing environment 103 can provide one or more management or configuration consoles through which an administrator of a virtualized deployment 112 can manage or oversee the operation of the deployment. The computing environment 103 can include many physical machines, virtual machines, and other software implemented in computing devices that can be centrally located, distributed geographically, and connected to one another through a network.

The computing environment 103 can include, for example, a server or any other system providing computing capability. Alternatively, the computing environment 103 can include one or more computing devices that are arranged, for example, in one or more server banks, computer banks, computing clusters, or other arrangements. The computing environment 103 can include a grid computing resource or any other distributed computing arrangement. The computing devices can be located in a single installation or can be distributed among many different geographical locations. The computing environment 103 can include or be operated as one or more virtualized computer instances in some examples.

The computing environment 103 can include a reference database 131. The computing environment 103 can also execute a data extractor 141 and prediction service 145. The data extractor 141 can receive operational data 111 from the various virtualized deployments 112 that report platform data to the computing environment 103. The data extractor 141 can also extract relevant data from the operational data 111 that can be used to generate predictive metrics by the prediction service 145. The prediction service 145 can receive requests to generate predicted requirements for a proposed deployment of an application. The prediction service 145 can then generate predicted infrastructure requirements based upon the operational data 111 that is saved into the reference database 131 by the data extractor 141.

The reference database 131 can include memory of the computing environment 103, mass storage resources of the computing environment 103, or any other storage resources on which data can be stored by the computing environment 103. The reference database 131 can include memory of the servers 115 in some examples. For instance, the reference database 131 can include one or more relational databases, such as structure query language (SQL) databases, non-SQL databases, or other relational or non-relational databases. The data stored in the reference database 131, for example, can be associated with the operation of the various services or functional entities described below.

The reference database 131 can include a database or other memory that includes provisioning data 135 as well as other data not discussed herein. The provisioning data 135 can include information extracted from the operational data 111 reported to the data extractor 141 describing the usage or status of the respective virtualized deployments 112. For each virtualized deployment 112 that reports operational data 111 back to the platform provider, the provisioning data 135 can include an indicator of the industry 147, an application type 149, and the scale 151 of the deployment. Additionally, the operational data 111 can include information such as how many and what type of physical servers are in a deployment. The operational data 111 can also include information about VMs in the deployment including the virtual CPU (vCPU) and memory allocated to the VMs. Based upon the data in the reference database 131, a measure of the provisioning power units (PPUs) 153 associated with the deployment can be calculated and stored in an entry of the reference database 131.

The indicator of the industry 147 identifies an industry vertical associated with an enterprise for which a virtualized deployment 112 was implemented. By tracking an industry associated with deployments, better predictions can be generated by the prediction service 145 because, in many cases, different enterprises in the same industry vertical or category can have similar requirements of a particular application even if the scales of the enterprises vary.

The application type 149 can identify the application deployed within the virtualized deployment 112. For example, in the case of a CRM deployment, the application type 149 can identify that the application is a CRM application as well as the vendor and version of the CRM service utilized in the virtualized deployment 112. The scale 151 represents an indicator of the size of the deployment. The scale 151 can represent a number of users to be supported by the deployment. A deployment can be implemented with a quantity of physical servers and VMs intended to support a population of users of a certain size. When the application is deployed, the VMs that report operational data 111 back to the data extractor 141 can report an indicator of the scale 151 of the deployment.

In some implementations, the provisioning data 135 can further include information about the physical servers in a virtualized deployment 112. Information about the physical servers can include CPU and memory of the servers. The operational data 111 can also include memory and vCPU consumption by or allocated to the VMs executing in the virtualized deployment 112. In some cases, the memory and vCPU data can be saved to the reference database 131.

The PPU 153 represents a measure of the processing power units associated with a particular virtualized deployment 112. PPU 153 is a measure that combines the memory and vCPU consumption of a particular deployment into a single expression. A predicted PPU requirement can be calculated by the prediction service 145 and used to generate a predicted vCPU and memory requirement of an application deployment, which is described in further detail below.

The prediction service 145 can generate a predicted PPU requirement for a requested application deployment. The requested application deployment can identify a requested application type, scale, and industry indicator. Using at least these three inputs, the prediction service 145 can generate, based upon the data stored in the reference database 131, a predicted PPU requirement for the deployment. From the predicted PPU requirement, the prediction service 145 can calculate a predicted vCPU requirement and predicted memory requirement. From the predicted vCPU and memory requirements, the prediction service 145 can then identify a combination of one or more physical servers that possess the requisite physical memory and CPU resources to provide. In some implementations, the prediction service 145 can generate multiple combinations of physical servers from a server inventory that vary in cost and performance but that provide the CPU and memory resources associated with the predicted PPU requirement. The process for generating a predicted PPU requirement and resultant predicted infrastructure requirements is described in more detail in the discussion of FIGS. 2-5.

Although not shown or discussed, the computing environment 103 can also execute other applications, services, processes, systems, engines, or functionality that can oversee the operation of various virtualized deployments 112. The computing environment 103 can provide tools or management consoles through which an enterprise customer can manage their respective deployments. In some cases, these tools or management consoles can be provided on premises, or directly through a service running on the virtualized deployment 112.

The client device 109 represents one or more computing devices through which a user can interact with the prediction service 145. For example, a worker can enter the application identity, a scale, and an industry indicator associated with the deployment of the application into a virtualized environment. The prediction service 145 can generate a predicted PPU requirement as well as a predicted memory and vCPU requirement for the deployment. The predictions generated by the prediction service 145 can be based upon the data from other virtualized deployments 112 that are stored in the reference database 131. The predictions generated by the prediction service 145 can be presented in a user interface at the client device 109.

Figure 2:
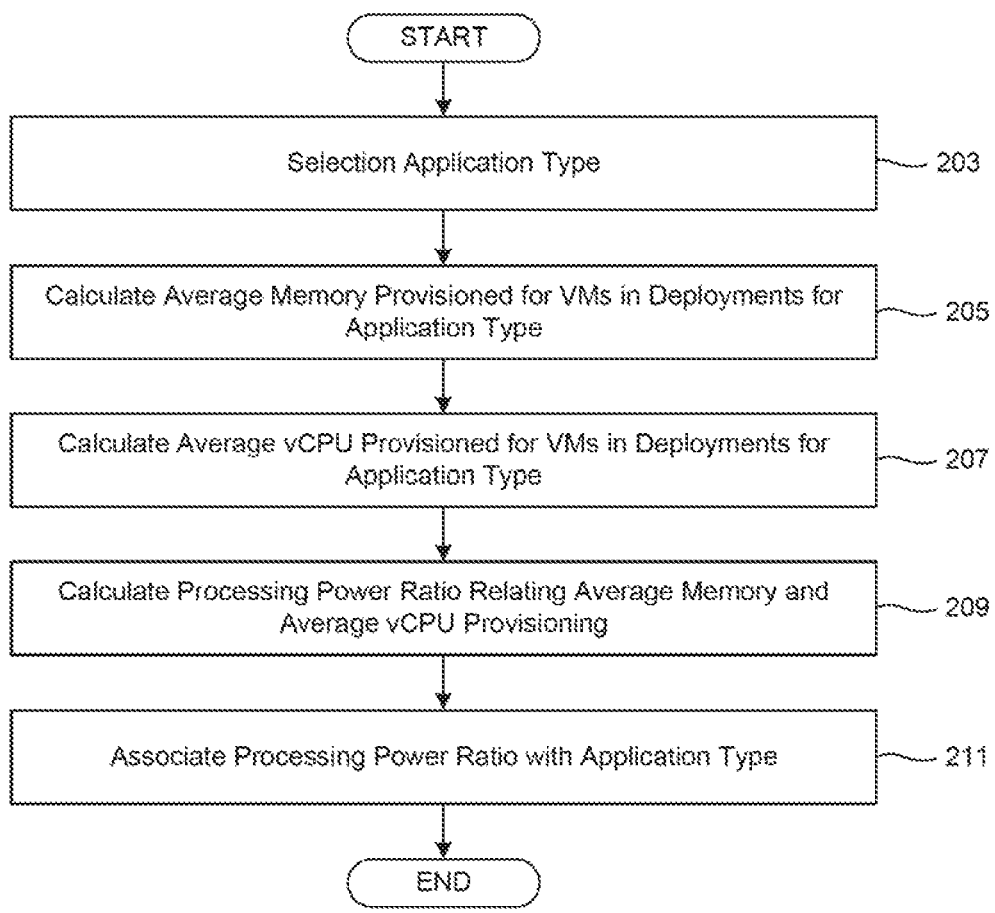
FIG. 2 is a flowchart illustrating functionality implemented by components of the networked computing environment of FIG. 1.

Referring now to FIG. 2, a flowchart is shown that provides one example of the operation of a portion of the networked environment 100. The flowchart of FIG. 2 can be viewed as depicting elements of a method implemented by the data extractor 141 or the prediction service 145 executing in the computing environment 103. The separation or segmentation of functionality is presented for illustrative purposes only. The process shown in FIG. 2 illustrates how the computing environment 103 can calculate a processing power ratio (PPR) based upon the operational data 111 reported back to the computing environment 103 by the virtualized deployments 112.

A PPR is calculated based upon virtualized deployments 112 of a particular application. The PPR provides a measure of the relative amount of vCPU and memory resources that deploying an application will entail. For example, the PPR that is calculated for an email server application provides a measure for the relative vCPU and memory resources that are required to deploy an email server application. The PPR of the email server application might vary a great deal from the PPR of a CRM application, which can inform the later calculation of a predicted PPU requirement of either type of application. Accordingly, the process shown in FIG. 2 can be performed for each application type 149 in the reference database 131.

Therefore, at step 203, the computing environment 103 can select a particular application type 149 for which the PPR will be calculated. The application type 149 can be associated with a particular application deployed in a virtualized deployment 112. Different offerings of a particular class of application, such as a CRM or enterprise resource planning (ERP) application, can be considered to have different application types 149.

At step 205, the computing environment 103 can calculate an average memory that is provisioned for the virtualized deployments 112 that are assigned the selected application type 149. The data regarding the amount of memory provisioned to each virtualized deployment 112 can be stored in the reference database 131 by the data extractor 141. The memory provisioned to each VM in a respective virtualized deployment 112 can be stored in the reference database 131. Accordingly, the computing environment 103 can calculate an average amount of memory provisioned to the VMs for each virtualized deployment 112 having the same application type 149.

At step 207, the computing environment 103 can calculate an average amount of vCPU resources provisioned to the virtualized deployments 112 that are assigned the selected application type 149. The data regarding the amount of vCPU resources provisioned to each virtualized deployment 112 can also be stored in the reference database 131 by the data extractor 141. The vCPU provisioned to each in a respective virtualized deployment 112 can be stored in the reference database 131. Accordingly, the computing environment 103 can calculate an average amount of vCPU resources provisioned to the VMs for each virtualized deployment 112 having the same application type 149.

Next, at step 209, the computing environment 103 can calculate the PPR relating the average memory and average vCPU provisioned to the VMs that are associated with the application type 149. In one example, the PPR for a given application type 149 can be represented by the following equation:

$$PPR_A = \frac{M_A}{C_A}$$

In the above equation, $PPR_A$ represents the PPR associated with a particular application type 149, A.

At step 211, the computing environment 103 can associate the calculated PPR with the application type 149 in the reference database 131. Thereafter, the process proceeds to completion. The PPR associated with each application type 149 can then be used to calculate the PPU associated with each virtualized deployment 112 in the reference database 131, as is described in the discussion of FIG. 3.

Figure 3:
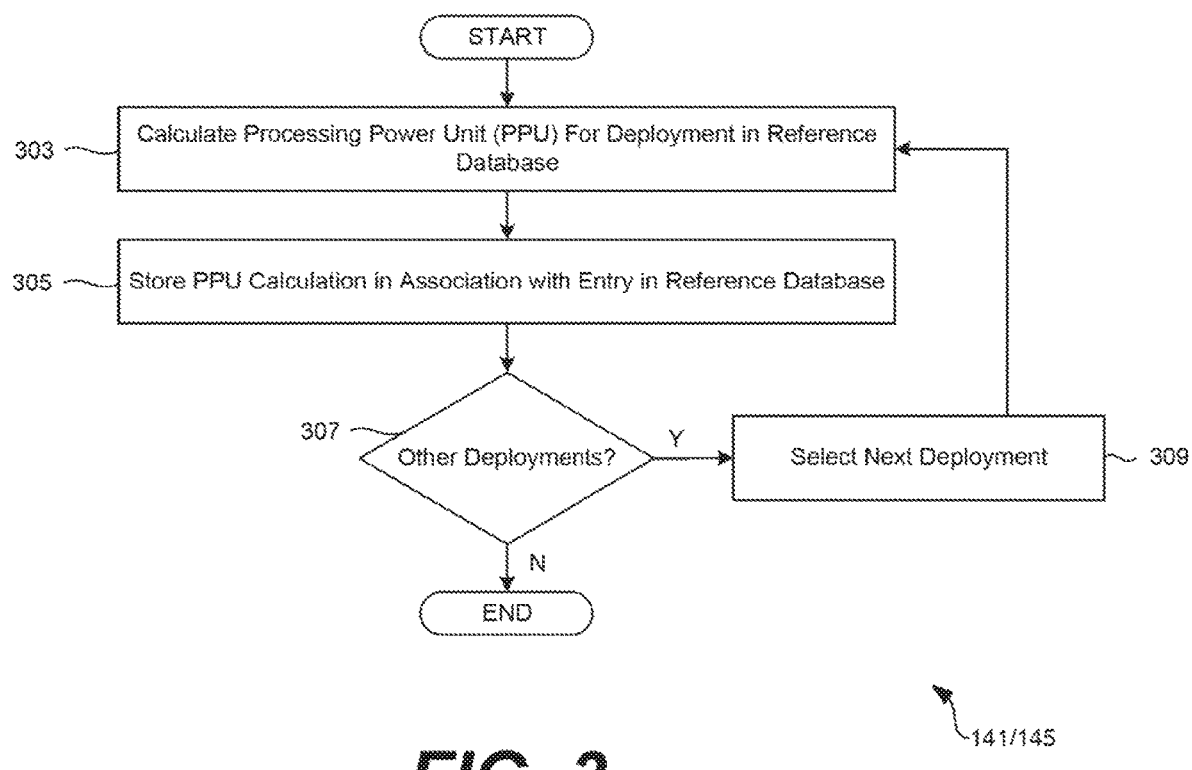
FIG. 3 is a flowchart illustrating functionality implemented by components of the networked computing environment of FIG. 1.

Referring now to FIG. 3, a flowchart is shown that provides one example of the operation of a portion of the networked environment 100. The flowchart of FIG. 3 can be viewed as depicting elements of a method implemented by the data extractor 141 or the prediction service 145 executing in the computing environment 103. The separation or segmentation of functionality as discussed herein is presented for illustrative purposes only. The process shown in FIG. 3 illustrates how the computing environment 103 can calculate a PPU for virtualized deployments 112 based on the information stored in the reference database 131.

The computing environment 103 can calculate a PPU associated with each virtualized deployment 112 that reports operational data 111 back to the computing environment 103. The PPU calculated for the deployment can provide a single measure that can assist the prediction service 145 with generating an estimate for the vCPU and memory resources that are required for a requested deployment of an application in another virtualized deployment 112.

Accordingly, at step 303, the computing environment 103 can calculate a PPU for a selected deployment in the reference database 131. The PPU can be calculated according to the following equation:

$$PPU = \text{Server Count} * \{(\text{vCPU count})*C_A + (\text{installed memory})*M_A\}$$

In the above equation, $C_A$ represents vCPU component of the PPR for the application type 149 associated with the selected deployment, and $M_A$ represents memory component of the PPR for the application type 149 associated with the selected deployment.

Additionally, the vCPU count can be determined using the following equation:

$$\text{vCPU count} = \text{number of cores per cpu} * \text{number of installed CPUs}$$

The Server Count represents a quantity of physical servers utilized in the virtualized deployment 112, which can be reported to the data extractor 141 as operational data 111 and stored in the reference database 131.

At step 305, the computing environment 103 can store the PPU calculation as the PPU 153 in the reference database. The PPU 153 is stored in association with the application type 149, the industry 147, and the scale 151 that is also stored in the reference database 131 for a given deployment. The PPU calculation can assist the prediction service 145 in later determining a predicted vCPU and memory requirement associated with a requested deployment.

At step 307, the computing environment 103 can determine whether there are additional deployments in the reference database 131 for which a PPU has not yet been calculated. If there are additional records for virtualized deployments 112 in the reference database 131, the process moves to step 309, where the computing environment 103 selects another deployment. From step 309, upon selecting another record associated with a virtualized deployment 112 from the reference database, the process returns to step 303, where the computing environment 103 calculates a PPU measure for the selected deployment.

From step 307, when the PPU measure is calculated for all of the virtualized deployments 112 in the reference database 131 have been calculated, the process proceeds to completion. Upon completing the process shown in FIG. 3, the reference database 131 contains information about various virtualized deployments 112 associated with various enterprises along with a PPU measure. Additionally, the PPU measure can be periodically or continuously calculated and updated based on data stored in the reference database 131. In this way, a feedback is created that is updated over time based upon new virtualized deployments 112 that are reporting operational data 111 back to the computing environment 103.

Figure 4:
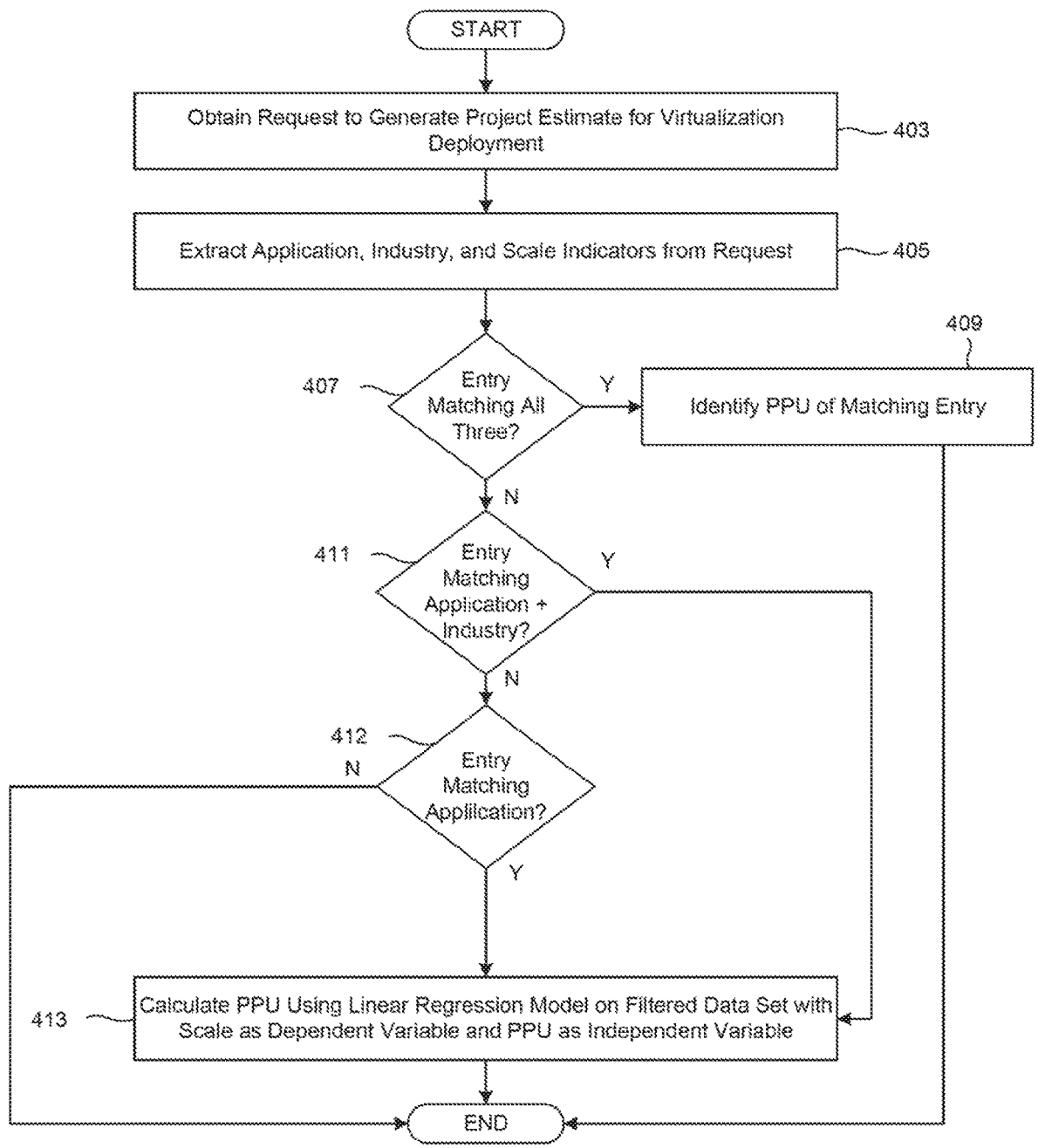
FIG. 4 is a flowchart illustrating functionality implemented by components of the networked computing environment of FIG. 1.
Figure 5:
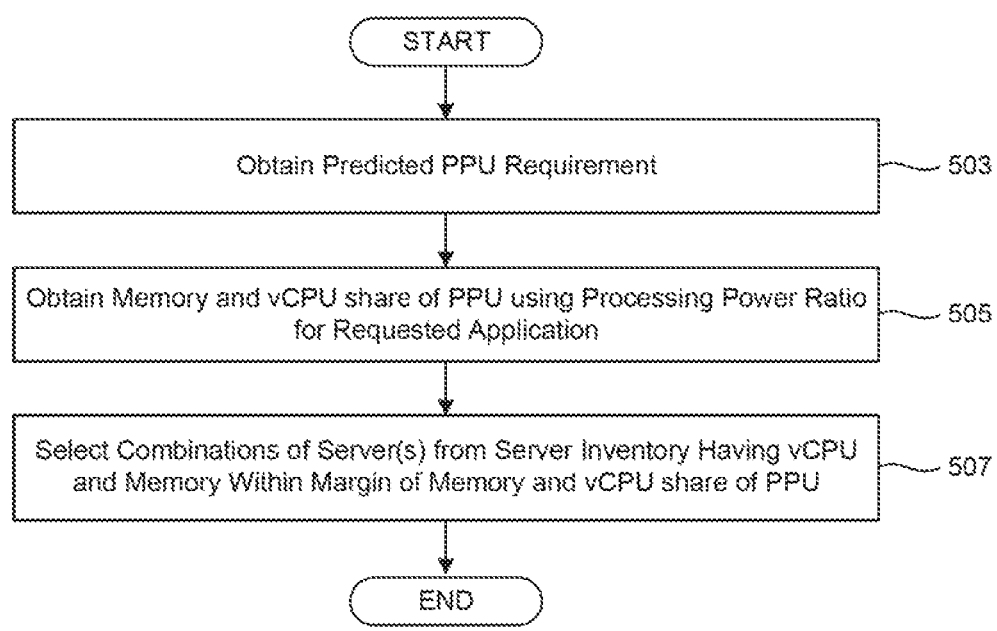
FIG. 5 is a flowchart illustrating functionality implemented by components of the networked computing environment of FIG. 1.

From the PPU measure and the other data stored in the reference database 131, the prediction service 145 can generate a predicted PPU requirement for other potential deployments, which is described in reference to FIGS. 4-5.

Referring now to FIG. 4, a flowchart is shown that provides another example of the operation of a portion of the networked environment 100. The flowchart of FIG. 4 can be viewed as depicting elements of a method implemented by the prediction service 145 executing in the computing environment 103. The separation or segmentation of functionality as discussed herein is presented for illustrative purposes only. The process shown in FIG. 4 illustrates how the prediction service 145 can generate a predicted PPU requirement for a requested deployment of an application using a virtualized deployment 112.

First, at step 403, the prediction service 145 can obtain a request to generate a project estimate for the server requirements to deploy an application in a virtualized environment. As noted above, the scale of a deployment refers to the number of users that the application deployment is expected to support. The request to generate a project estimate can be received from a user through a user interface provided by the prediction service 145. In another example, the request to generate the project estimate can be received from the user through a special purpose application that communicates with the prediction service 145.

At step 405, the prediction service 145 can extract a requested application type, a requested industry indicator, and a requested scale from the request. The application type can identify the application that the enterprise seeks to be deployed in a virtualized deployment 112. A user interface can allow the user to select from preconfigured application indicators for which data is stored about other deployments in the reference database 131. The industry indicator can identify an industry parameter associated with the enterprise seeking deployment. The industry parameter can allow the prediction service 145 to generate a predicted PPU requirement from other deployments in the same industry if data about other deployments of the same application or a similar scale are stored in the reference database 131. Similarly, a user interface associated with the prediction service 145 can allow the user to select from various industry indicators for which data is stored about other deployments in the reference database 131.

The requested scale parameter can identify an estimated user population that the deployment is expected to support. A requested scale parameter can allow the prediction service 145 to generate a predicted PPU requirement from other deployments that are of a similar scale as the requested deployment.

Next, at step 407, the prediction service 145 can determine whether an entry in the reference database 131 matches the requested scale, the requested application type, and the requested industry indicator. The prediction service 145 can determine that an entry matches the requested scale if the scale 151 of a particular entry is within an acceptable margin of the requested scale. An acceptable margin can be a preconfigured margin.

The prediction service 145 can determine that an exact match is necessary for the application type 149 and industry 147. In some implementations, the prediction service 145 can determine that a set of application types 149 are considered matches if they are in a similar application category to broaden the set of application types 149 that are considered matches with one another. Similarly, the prediction service 145 can determine that a set of industry 147 indicators are considered matches if they are in a similar industry category to broaden the set of industries 147 that are considered matches with one another.

If all three of the requested scale, the requested application type, and the requested industry indicator match an entry in the reference database, the process proceeds from step 407 to step 409. At step 409, the prediction service 145 can identify the PPU of the matching entry in the reference database 131. The identified PPU can form the basis of the predicted PPU requirement for the requested application deployment. From step 409, the process can proceed to completion, as FIG. 5 illustrates how the prediction service 145 can determine a predicted vCPU and memory requirement of the application deployment from the predicted PPU requirement.

If, at step 407, an entry matching all three of the requested application type, industry indicator, and scale cannot be found in the reference database, the process proceeds to step 411. At step 411, the prediction service 145 can identify entries in the reference database 131 matching the requested application type and industry indicator. If no entries or fewer than a threshold number of entries match both parameters, the process can proceed to step 412. Otherwise, the process can proceed to step 413, where the identified entries form the basis for generating a predicted PPU requirement.

At step 412, because not enough entries were found matching both the application type and the industry indicator at step 411, the prediction service 145 can identify entries in the reference database 131 matching the requested application type. If no entries or fewer than a threshold number of entries match the application type, the process can proceed to completion, as a large enough sample size to generate a prediction cannot be found in the reference database 131. Otherwise, the process can proceed to step 413, where the identified entries form the basis for generating a predicted PPU requirement.

At step 413, the prediction service 145 can calculate a predicted PPU requirement of the requested application deployment by utilizing a linear regression model on the dataset that includes the entries identified in steps 411 or 412. The linear regression model can be represented as follows:

$$PPU_{req} = \alpha * Scale + \beta$$

In the above model, $PPU_{req}$ represents the predicted PPU requirement of the requested application deployment and serves as the dependent variable of the model. $PPU_{req}$ is dependent upon the scale, which acts as the independent variable of the model. The model can project $PPU_{req}$ utilizing the data set of entries in the data set identified in steps 411 or 412. $PPU_{req}$ can serve as the basis of the predicted PPU requirement for the requested application deployment. From step 413, the process can proceed to completion, as FIG. 5 illustrates how the prediction service 145 can determine a predicted vCPU and memory requirement of the application deployment from the predicted PPU requirement.

Referring now to FIG. 5, a flowchart is shown that provides another example of the operation of a portion of the networked environment 100. The flowchart of FIG. 5 can be viewed as depicting elements of a method implemented by the prediction service 145 executing in the computing environment 103. The separation or segmentation of functionality as discussed herein is presented for illustrative purposes only. The process shown in FIG. 5 illustrates how the prediction service 145 can map the predicted PPU requirement of a requested application deployment to a requested vCPU and memory requirement, which can in turn be mapped to a predicted physical server requirement.

First, at step 503, the prediction service 145 can obtain the predicted PPU requirement generated as illustrated in the process shown in FIG. 4. Once the predicted PPU requirement is obtained, the process can proceed to step 505.

At step 505, the prediction service 145 can obtain the memory and vCPU share of the predicted PPU requirement by utilizing the PPR corresponding to the application type of the requested application. As noted above, the PPR for a particular application is a ratio that can relate the average provisioned memory and average provisioned vCPU for deployments of a particular application type 149. Accordingly, a predicted vCPU requirement for the application deployment can be calculated from the predicted PPU requirement as follows:

$$C = \frac{C_A}{C_A + M_A} * PPU_{req}$$

In the above equation, C is the predicted vCPU requirement for the application deployment and $PPU_{req}$ is the predicted PPU requirement calculated by the prediction service 145. $C_A$ is the vCPU component of the PPR for the application type 151 of the requested application deployment, and $M_A$ is the memory component of the PPR for the application type 151 of the requested deployment.

Similarly, a predicted memory requirement for the application deployment can be calculated from the predicted PPU requirement as follows:

$$M = \frac{M_A}{C_A + M_A} * PPU_{req}$$

In the above equation, M is the predicted memory requirement for the application deployment and $PPU_{req}$ is the predicted PPU requirement calculated by the prediction service 145. $C_A$ is again the vCPU component of the PPR for the application type 151 of the requested application deployment, and $M_A$ is the memory component of the PPR for the application type 151 of the requested application deployment. Once the predicted vCPU and predicted memory requirements of the application deployment have been calculated, the process can proceed to step 507.

At step 507, the prediction service 145 can select one or more combinations of physical servers that meet the predicted vCPU and predicted memory requirements calculated by the prediction service. A combination of physical servers can be selected from a server inventory, which can include a real server inventory and a reference library of servers that can be acquired for the application deployment, that collectively meet or exceed the predicted vCPU and predicted memory requirements of application deployment. The server inventory can include physical servers of varying CPU and memory capacities. The server inventory can also include physical servers of varying performance and cost categories. The server inventory can include high-performance high-cost servers as well as lower-performance and lower-cost servers.

Accordingly, the prediction service 145 can select a high-performance combination of servers to meet the predicted vCPU and memory requirements of the application deployment or a low-cost combination of servers to meet the requirements. The prediction service 145 can also select a combination of high-performance and low-cost servers to meet the predicted vCPU and memory requirements. Additionally, the prediction service 145 can select a combination of any number of different server types and combine to meet the predicted memory and CPU requirements of the application deployment.

The prediction service 145 can also calculate a PPU measure for each of the servers in the server inventory using the PPR of the requested application type. Then, as an example, the prediction service 145 can select a server combination as follows:

$$PPU^{req} \leq X*PPU_1 + Y*PPU_2 + Z*PPU_3$$

In the above equation, $PPU^{req}$ represents the predicted PPU requirement of the application deployment. $PPM_1$, $PPU_2$, and $PPU_3$ are the PPU of three different servers from the server inventory, and X, Y, and Z represent a quantity of the different servers from the server inventory. The different servers from the inventory can be associated with a varying cost and performance based upon server hardware costs, maintenance costs, real estate, cooling costs, facilities costs, and labor costs to acquire or deploy the server. Accordingly, the prediction service 145 can vary the quantity of the various servers from the server inventory for performance effective solutions or cost effective solutions.

The flowcharts of FIGS. 2-5 show examples of the functionality and operation of implementations of components described herein. The components described herein can include hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIGS. 3-5 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all variations are within the scope of the present disclosure.

The components described herein can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit.

The components described herein can be embodied in the form of hardware, as software components that are executable by hardware, or as a combination of software and hardware. If embodied as hardware, the components described herein can be implemented as a circuit or state machine that employs any suitable hardware technology. This hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as magnetic, optical, semiconductor, or other suitable media. Examples of a suitable computer-readable media include, but are not limited to, solid-state drives, magnetic drives, and flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All modifications and variations are intended to be included herein within the scope of this disclosure.

What is claimed is:

1. A method for predicting infrastructure requirements of a requested application deployment, comprising:

for a plurality of applications deployed in virtualized deployments:
  obtaining, from a reference database, an average amount of provisioned memory across virtual machines associated with the deployments;
  obtaining, from the reference database, an average amount of provisioned virtual central processing unit (vCPU) across virtual machines associated with the deployments; and
  calculating a processing power ratio relating the average amount of provisioned memory and the average amount of provisioned vCPU for the deployments of the application;
calculating a measure of processing power units for each deployment of the applications based upon the processing power ratio;
storing the measure of processing power units for a respective deployment in the reference database, the reference database storing an industry indicator, an application type, and a scale indicator for the respective deployment;
obtaining a request to estimate a server requirement for the requested application deployment, the request containing a requested application type, a requested industry indicator, and a requested scale;

generating a predicted processing power unit (PPU) requirement based upon data in the reference database; and generating a predicted memory requirement and a predicted vCPU requirement based upon the predicted PPU requirement for the requested application deployment.

2. The method of claim 1, wherein the predicted PPU requirement is generated using a linear regression model based upon data stored in the reference database, wherein the predicted PPU requirement is a dependent variable and the requested scale is an independent variable of the linear regression model.

3. The method of claim 1, wherein the predicted PPU requirement is generated by identifying an entry in the reference database matching the requested application type and the requested industry indicator, and wherein the requested scale is within an acceptable margin of the scale indicator of the entry.

4. The method of claim 1, wherein the predicted memory requirement and the predicted vCPU requirement are calculated using the processing performance ratio for the application that matches the requested application type.

5. The method of claim 1, further comprising identifying at least one server from a server inventory meeting or exceeding the predicted memory requirement and the predicted vCPU requirement.

6. The method of claim 5, wherein the server inventory comprises a plurality of servers of varying cost and varying performance, and the at least one server comprises a combination of at least a subset of the plurality of servers.

7. The method of claim 6, further comprising selecting a plurality of configurations of servers from the server inventory, wherein a first configuration comprises a high performance configuration of servers meeting the predicted PPU requirement and a second configuration comprises a low cost configuration of servers meeting the predicted PPU requirement.

8. A system for predicting infrastructural requirements of a requested application deployment, comprising: a hardware processor;
at least one application executed by a computing environment and the hardware processor, the application causing the computing environment to at least;
for a plurality of applications deployed in virtualization deployments;
obtain, from a reference database, an average amount of provisioned memory across virtual machines associated the deployments;
obtain, from the reference database, an average amount of provisioned virtual central processing unit (vCPU) across the virtual machines associated with the deployments; and
calculate a processing power ratio relating the average amount of provisioned memory and the average amount provisioned vCPU;
calculate a measure of processing power units for each deployment based upon the processing power ratio;
store the measure of processing power units for a respective deployment in the reference database, the reference database storing an industry indicator, an application type, and a scale indicator for the respective deployment;
obtain a request to estimate a server requirement for the requested application deployment, the request containing a requested application type, a requested industry indicator, and a requested scale;

generate a predicted processing power unit (PPU) requirement based upon data in the reference database; and
generate a predicted memory requirement and a predicted vCPU requirement based upon the predicted PPU requirement for the requested application deployment.

9. The system of claim 8, wherein the predicted PPU requirement is generated using a linear regression model based upon data stored in the reference database, and wherein the predicted PPU requirement is an independent variable and the requested scale is a dependent variable of the linear regression model.

10. The system of claim 8, wherein the predicted PPU requirement is generated by identifying an entry in the reference database matching the requested application type and the requested industry indicator, and wherein the requested scale is within an acceptable margin of the scale indicator of the entry.

11. The system of claim 8, wherein the predicted memory requirement and the predicted vCPU requirement are calculated using the processing performance ratio for the application that matches the requested application type.

12. The system of claim 8, wherein the at least one application further causes the at least one computing device to at least identify at least one server from a server inventory matching the predicted memory requirement and the predicted vCPU requirement.

13. The system of claim 12, wherein the server inventory comprises a plurality of servers of varying cost and varying performance, and the at least one server comprises a combination of at least a subset of the plurality of servers.

14. The system of claim 13, further comprising selecting a plurality of configurations of servers from the server inventory, wherein a first configuration comprises a high performance configuration of servers meeting the predicted PPU requirement and a second configuration comprises a low cost configuration of servers meeting the predicted PPU requirement.

15. A non-transitory computer-readable medium embodying a program for predicting infrastructural requirements for an application deployment, the program comprising instructions that, when executed by the at least one computing device, cause the at least one computing device to at least:
for a plurality of applications deployed in virtualization deployments:
obtain, from a reference database, an average amount of provisioned memory across virtual machines associated with the deployments;
obtain, from the reference database, an average amount of provisioned virtual central processing unit (vCPU) across virtual machines associated with the deployments; and
calculate a processing power ratio relating the average amount of provisioned memory and the average amount of provisioned vCPU;
calculate a measure of processing power units for each deployment of the applications based upon the processing power ratio;
store the measure of processing power units for a respective deployment in the reference database, the reference database storing an industry indicator, an application type, and a scale indicator for the respective deployment;
obtain a request to estimate a server requirement for the requested application deployment, the request containing a requested application type, a requested industry indicator, and a requested scale;

generate a predicted processing power unit (PPU) requirement based upon data in the reference database; and generate a predicted memory requirement and a predicted vCPU requirement based upon the predicted PPU requirement for the requested application deployment.

16. The non-transitory computer-readable medium of claim 15, wherein the predicted PPU requirement is generated using a linear regression model based upon data stored in the reference database, wherein the predicted PPU requirement is an independent variable and the requested scale is a dependent variable of the linear regression model.

17. The non-transitory computer-readable medium of claim 15, wherein the predicted PPU requirement is generated by identifying an entry in the reference database matching the requested application type and the requested industry indicator, and wherein the requested scale is within an acceptable margin of the scale indicator of the entry.

18. The non-transitory computer-readable medium of claim 15, wherein the program, when executed, further causes the at least one computing device to at least identify at least one server from a server inventory matching the predicted memory requirement and the predicted vCPU requirement.

19. The non-transitory computer-readable medium of claim 15, wherein the program, when executed, further causes the at least one computing device to at least identify at least one server from a server inventory matching the predicted memory requirement and the predicted vCPU requirement.

20. The non-transitory computer-readable medium of claim 19, wherein the server inventory comprises a plurality of servers of varying cost and varying performance, and the at least one server comprises a combination of at least a subset of the plurality of servers.

* * * * *